Feb. 27, 1945.  J. W. SIMMONS  2,370,375
FASTENER
Filed July 27, 1944

INVENTOR,
John W. Simmons
BY Hull & West
ATTORNEYS.

Patented Feb. 27, 1945

2,370,375

UNITED STATES PATENT OFFICE 2,370,375

FASTENER

John W. Simmons, Cleveland Heights, Ohio

Application July 27, 1944, Serial No. 546,775

8 Claims. (Cl. 85—32)

This is a continuation in part of my application Serial No. 506,385, filed October 15, 1943, and among the objects of the invention that constitutes the subject matter of the present case is the general one of producing a quick acting fastener that is capable of being readily applied to an entering element, desirably threaded, as a screw or bolt, and that will, when compressed axially of the entering element, exert an extremely powerful hold thereon. The compression of the fastener, when a threaded entering element is employed, is effected by turning the entering element in an appropriate direction and, in the case of a smooth entering element, by applying pressure to the fastener, as by means of a tool, in a direction axially of the entering element.

Another object of the invention is to provide a quick acting fastener that may be simply and economically produced from linear material, such as strip metal, and which has a multiple thread contact, or one of similar nature, with each of the opposite sides of an entering element wherewith it is used, thereby to materially increase its holding power over that of fasteners of the same general class but capable of only single point or thread contact with each side of an entering element.

A further object is to provide a fastener of the kind above referred to that is constructed of an elongated piece of material, and so designed that said piece of material may be punched or otherwise treated to allow passage of an entering element through the plane thereof and that may be serrated or otherwise treated to provide multiple tooth or thread contact with the opposite sides of such element, all while the piece of material is in flat or substantially flat condition, the piece thereafter being shaped to the form of the finished article.

While I have disclosed herein certain embodiments of the invention, I wish it to be understood that these embodiments are illustrative and are not intended as limiting the invention to the shapes and structural details of said embodiments further than required by the terms of the appended claims.

Figure 1:
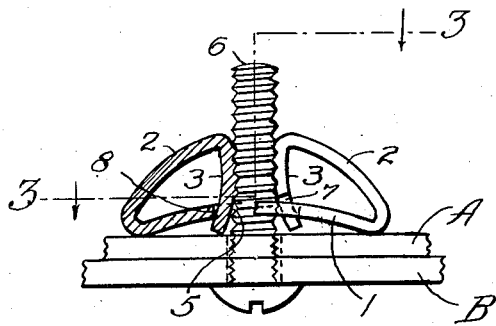
Figure 4:
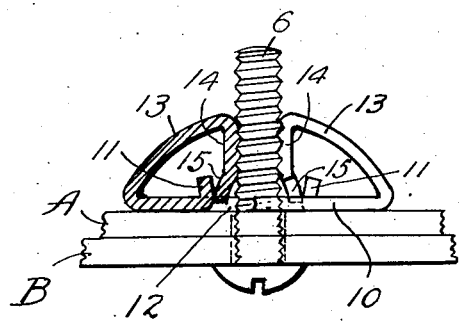
Figure 2:
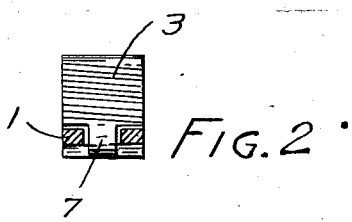
Figure 5:
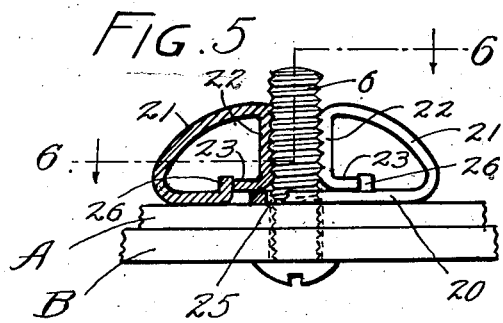
Figure 3:
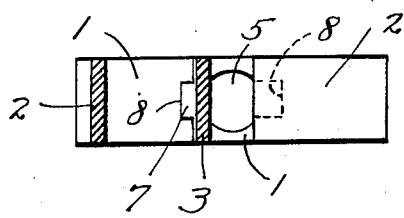
Figure 6:
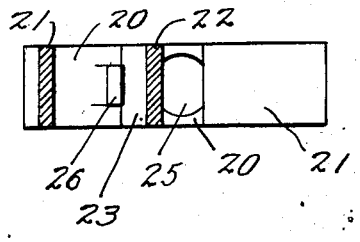

In the drawing, Fig. 1 is a side elevational view, partly in section, of one form of the invention; Fig. 2 is a central transverse section through the fastener shown in Fig. 1; Fig. 3 is a plan view thereof, partly in section, as indicated by the line 3—3 of Fig. 1; Figs. 4 and 5 are views, each similar to Fig. 1, of two other forms of the invention, and Fig. 6 is a plan view, partly in section, of the fastener shown in Fig. 5, as indicated by the line 6—6 of the latter view.

The fastener illustrated in Figs. 1 to 3 comprises a base 1, desirably slightly arched from end to end, and beyond the ends of the base the portions of the piece or strip of material from which the fastener is fabricated are turned upwardly and inwardly over the base, as indicated at 2, and thence downwardly toward the central portion of the base to provide the element contacting portions or jaws 3. The base 1 is provided with a central aperture 5 for the accommodation of the entering element 6 which may consist of a standard screw or bolt. Said aperture is desirably elongated, and the ends of the strip are reduced in width to provide short struts 7 that are projected into said aperture in position to bear against the abutments 8 provided by the end walls of said aperture.

Shown associated with the fastener in Figs. 1, 4 and 5 are members A and B that are secured together by the entering element, designated in all of said views by the reference numeral 6, said members A and B having registering holes through which the entering element is projected before the fastener is applied thereto. When the fastener shown in Figs. 1 to 3 is applied to the entering element, the parts 2 yield with respect to the base 1 and thus allow the jaws 3 to separate enough to receive the entering element between them, the upper ends of the jaws spreading further than the lower ends, due to engagement of the struts 7 with the abutments 8. When the base of the fastener engages the member A and the entering element has been projected through the holes in the members A and B and through the fastener as far as it will readily go, the inherent resiliency of the piece or strip of material from which the fastener is formed will cause the fastener to hold the elements of the assembly in compact condition. Now, by turning the entering element, as by means of a screw driver, in the proper direction, the jaws 3 will be caused to move toward the base 1 and to approach each other, and the looped ends of the fastener, comprising said jaws and the parts 2, will be placed under compression, thus causing the fastener to exert a very powerful hold upon the entering element.

Fig. 4 shows a modification of the invention wherein the base 10 is provided with upstanding lugs 11 that may consist of parts struck from the base when the aperture 12 is punched or otherwise made in the strip of material for the passage of the entering element 6. Parts 13 extend upwardly and inwardly from the ends of the base and join the upper ends of the element contacting portions or jaws 14, and the terminals of the strip of material are suitably shaped to provide bearing portions or struts 15 that engage the abutments provided by the inner surfaces of the lugs 11.

The opposed lugs 11 preferably converge toward the base and function as cams when the struts 15 traverse their inner surfaces during compression of the fastener, thus causing the jaws 14 to be urged into very firm engagement with the opposite sides of the entering element.

The fastener illustrated in Figs. 5 and 6 consists of a base 20 beyond the ends of which the portions of the strip of material from which the fastener is constructed are looped upwardly and inwardly over the base, the looped ends including parts 21, jaws 22 and struts 23, the latter consisting of the terminals of the strip. The base is provided with a central aperture 25 for the passage of the entering element 6, and rising from the base, intermediate said aperture and the ends of the base, are lugs 26. Said lugs are desirably struck from the base, and their inner surfaces form abutments against which the struts 23 bear. It is apparent in this case that when the entering element is turned in an appropriate direction it will feed the jaws 22 toward the base and compress the struts 23 against the lugs 26, thereby creating a force that urges the jaws into very firm contact with the opposite sides of the entering element.

In all cases, the element contacting surfaces of the jaws of the fastener are serrated or otherwise treated to provide thread-like parts or teeth that cooperate with the threads of screws, bolts, or other threaded entering elements, or with the ridges or projections of entering elements that are notched or corrugated, or that embed themselves within the surface of a smooth entering element of material softer than that of the fastener.

While I have mentioned strip metal as an example of the linear material from which the fastener is constructed, I wish it understood that any material suited to the purpose may be employed, such as certain plastics, fiber, or wholly or partially non-metallic material.

Having thus described my invention, what I claim is:

1. A fastener constructed of a strip of material shaped to provide a base and parts extending upwardly and inwardly from the ends of the base and thence downwardly in opposed relation to each other to provide element contacting portions, the ends of said strip beyond said portions constituting struts, the base being apertured for the passage of an entering element adapted to be projected between said contacting portions and provided with abutments spaced inwardly from its ends against which said struts bear.

2. A fastener constructed of a strip of material shaped to provide a base and parts extending upwardly and inwardly from the ends of the base and thence toward the base in opposed relation to each other to provide element contacting portions, the terminals of said strip beyond said portions being reduced in width to provide struts, the base being apertured for the passage of an entering element adapted to be projected between said contacting portions and to provide abutment surfaces against which said struts bear.

3. A fastener constructed of a strip of material shaped to provide a base and parts extending upwardly and inwardly from the ends of the base and thence toward the base in opposed relation to each other to provide element contacting portions, the terminals of said strip beyond said portions being reduced in width to provide struts, the base having an aperture for the passage of an entering element adapted to be projected between said contacting portions, said aperture being elongated in a direction lengthwise of the base, and said struts projecting into the aperture for engagement with the end walls thereof.

4. A fastener constructed of a strip of material shaped to provide a base and parts extending upwardly and inwardly from the ends of the base and thence toward the base in opposed relation to each other to provide element contacting portions, the base incorporating upstanding lugs outwardly against which the terminals of the strip have bearing, the base being provided with an aperture on the opposite sides of whose axis the aforesaid element contacting portions are disposed.

5. A fastener constructed of a strip of material shaped to provide a base and parts extending upwardly and inwardly from the ends of the base and thence downwardly in opposed relation to each other to provide element contacting portions, the base incorporating opposed downwardly converging cam surfaces against which the terminals of the strip have bearing, the base being provided with an aperture through which an entering element is adapted to be projected for engagement between the aforesaid element contacting portions.

6. A fastener constructed of a strip of material shaped to provide a base and parts extending upwardly and inwardly from the ends of the base and thence downwardly in opposed relation to each other to provide element contacting portions, the base having an aperture through which an entering element is adapted to be projected for engagement between the aforesaid element contacting portions and incorporating upstanding lugs situated between the axis of said aperture and the ends of the base, the sides of the lugs toward said axis converging downwardly thereby to provide cam surfaces outwardly against which the terminal portions of the strip have bearing.

7. A fastener constructed of a strip of material shaped to provide a base and parts extending upwardly and inwardly from the ends of the base and thence toward the base in opposed relation to each other to provide element contacting portions, the base being provided with an aperture through which an entering element is adapted to be projected for engagement between the aforesaid element contacting portions, parts of the strip inwardly of the ends of the base being extended upwardly from the plane of the base to provide abutments outwardly against which the terminals of the strip bear.

8. A fastener constructed of a strip of material shaped to provide a base and a part extending upwardly and inwardly from an end of the base and thence toward the base to provide an element contacting portion, the base incorporating an upstanding part against which the terminal of the strip adjacent said contacting portion has bearing, the base being provided with an aperture through which an entering element may be projected for cooperation with said contacting portion, said upstanding part coacting with the terminal of the strip in such manner as to enhance the pressure of said contacting portion upon the entering element.

JOHN W. SIMMONS.